May 4, 1971   A. GUSTAFSON   3,577,301
APPARATUS FOR THE PRODUCTION OF TETRAHEDRAL HOLLOW ARTICLES
Filed Sept. 28, 1967   3 Sheets-Sheet 1

INVENTOR
AKE GUSTAFSON

BY *Wenderoth, Lind & Ponack*
ATTORNEYS

United States Patent Office 3,577,301
Patented May 4, 1971

3,577,301
APPARATUS FOR THE PRODUCTION OF
TETRAHEDRAL HOLLOW ARTICLES
Ake Gustafson, Le Chatelet, Chatel-Saint-Denis, Switzerland, assignor to Tetra Pak AG, Zurich, Switzerland
Filed Sept. 28, 1967, Ser. No. 671,397
Claims priority, application Switzerland, Sept. 28, 1966,
13,999/66, 14,000/66
Int. Cl. B32b 31/02
U.S. Cl. 156—461          5 Claims

ABSTRACT OF THE DISCLOSURE

Tetrahedral hollow articles are produced by forming a tube from a travelling web and passing the tube through a rigid guide means contacting the tube in at least two diametrically opposite regions so as to displace the position of undesirable kinks in the articles formed. Subsequently spaced apart transverse seams are provided across the tube. The guide means may be a plate having a square opening and a flexible sleeve of inelastic material is secured in the square opening. The total internal peripheral length of the opening is substantially equal to the circumference of the tube passing through the opening.

---

Figure 1:
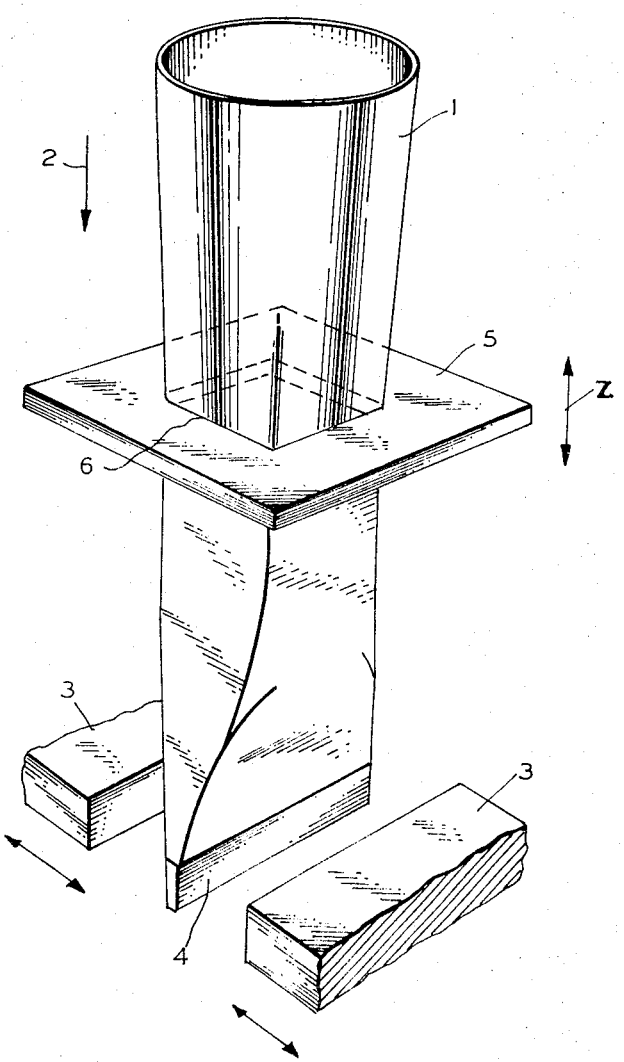

The present invention relates to a method, and apparatus, for the production of tetrahedral hollow articles, particularly packages for fluent materials in which a web is formed into a tube and subsequently provided with spaced-apart transverse seams which are substantially perpendicular to the longitudinal axis of the tube.

It is known that such material-filled packages may be produced from feedstock in web form by a method which involves first shaping the web material into a substantially circular cylindrical tube. Areas of the web adjacent to its longitudinal edges are then secured together and the tube is filled with the desired material. Individual packages are then formed from the filled tube by sealing off the tube transversely to the axis of the tube in zones spaced axially of the tube.

The said steps in the method preferably proceed continuously, but obviously provision must always be made for the level of the material filled into the tube not to extend above the uppermost point reached by the finished longitudinal seam, because otherwise the filling material would run out through the gap between the longitudinal edges of the tube where they have not yet been secured together.

Since the tube formed from web material is filled shortly before the completion transverse seam is formed, the transverse seam has to be applied to the filled tube. When the sealing jaws are pressed against the tightly filled tube it has been found by experience that just below the transverse seam, a kink is formed, usually a curved kink, which weakens the tube at the point in question and moreover imparts an ugly appearance to the package.

By employing the method according to the present invention, it is possible to displace the position of this undesirable kink at will and consequently the kink can be positioned so that it coincides with the transverse seam and is thus concealed by it.

According to one aspect of the present invention a method for the production of tetrahedral hollow articles comprises forming a web into a tube and securing areas of the web adjacent to its longitudinal edges together to form a longitudinal seam and subsequently forming spaced-apart transverse seams across the tube to define therebetween the hollow articles, characterized in that after formation of the longitudinal seam but prior to formation of a transverse seam, the tube is passed through a rigid guide means having an edge contacting the tube in at least two diametrically opposite regions, the separation of said regions being not greater than the original diameter of the tube.

Preferably, the guide means defines an opening whose internal peripheral length is substantially equal to the circumference of the tube. The opening may be of substantially square section.

It is particularly advantageous to pass the tube through a flexible sleeve of inelastic material as it leaves the guide means.

According to a further aspect of the present invention, apparatus for producing tetrahedral hollow articles comprises means to form a web into a tube by securing parallel edges of the web together, an apertured plate extending at right angles to the direction of advance of the tube through which the tube passes and which contacts the tube in at least two diametrically opposite regions, and means to form transverse seams at spaced intervals across the tube, after the tube has passed through the plate. In the formation of tetrahedral packages or containers, it is understood that the spaced seams of a given package are formed one transversely to the other.

Figure 2:
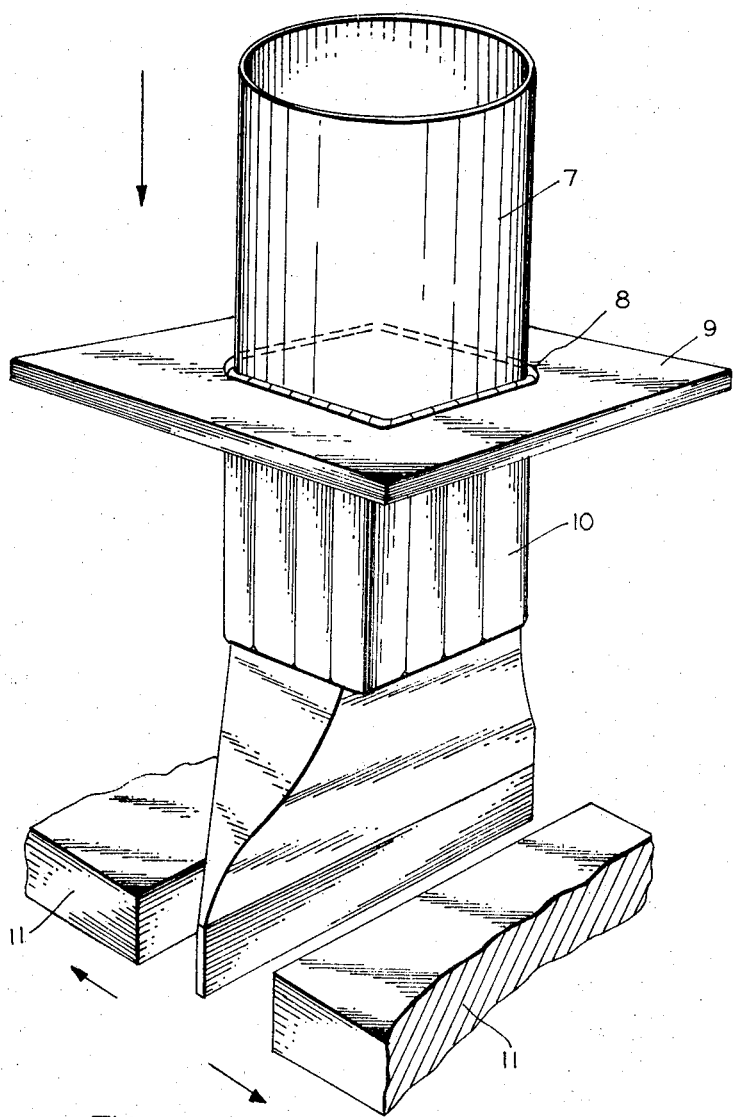
Figure 3:
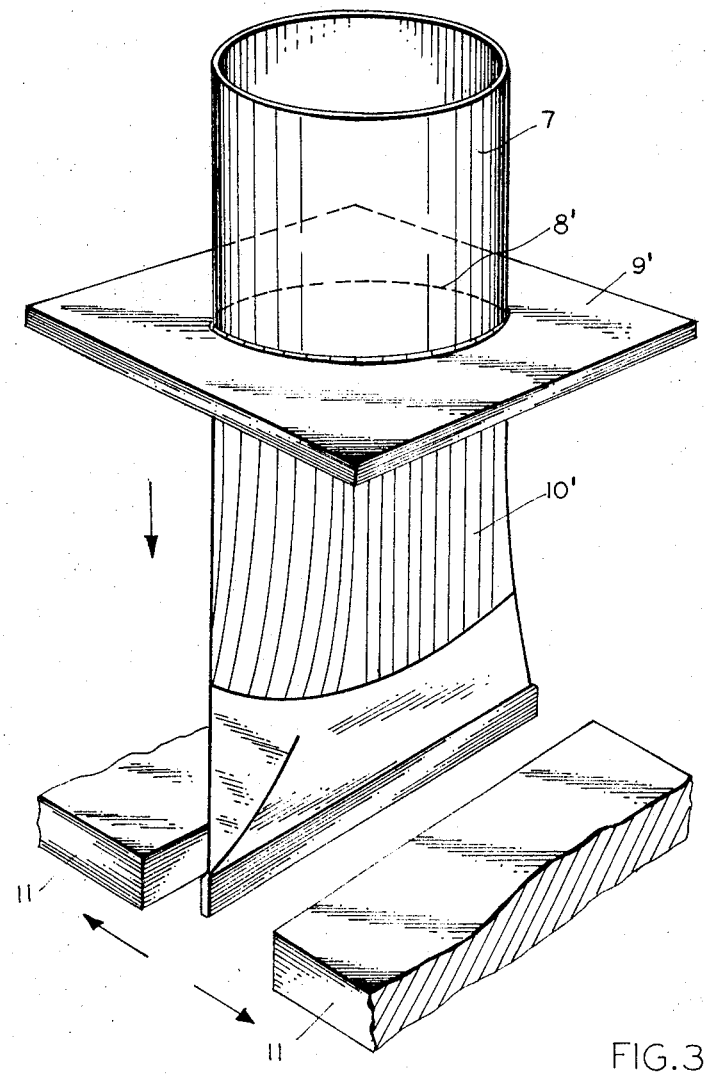

The invention will now be described, by way of example, with reference to the accompanying drawings, in which:

FIGS. 1, 2 and 3 are schematic perspective views of three embodiments of apparatus in accordance with the invention.

FIG. 1 shows a tube 1 preformed of web material, which may consist for example of paper coated on both sides with plastics, in which areas of the web adjacent to its longitudinal edges are sealed together to form a longitudinal seam (not shown). The tube 1 moves in the direction of the arrow 2 downwards towards two sealing jaws 3 which have just produced a transverse seam 4. The jaws 3 are heated, for example electrically, and on being brought together transfer their heat to zones of the tube 1 trapped therebetween and thus cause welding together of the zones to form the seam 4. Experience shows that a curved kink is formed below each jaw as the jaws 3 are brought together. To avoid formation of this kink, a rigid plate 5 having an aperture 6 of square cross-section is provided above the jaws 3. The tube 1 passes through the aperture 6 and thereby undergoes a certain deformation so that a kink is deliberately created when the seam 4 is formed. The position of this kink may be displaced at will by a simple adjustment of the height of the plate 5 in the directions of the arrows Z and it can accordingly be arranged that the kink coincides with the transverse seam 4 and is absorbed by it.

The cross-section of the aperture 6 can vary from the shape shown in FIG. 1 depending on the prevailing conditions (e.g. stiffness of the web material and diameter of the tube 1). Thus, for example, the sides of the square aperture shown need not be rectilinear but could be curved.

The internal peripheral length of the aperture should advantageously be at least substantially equal to the external circumference of the tube 1.

It is also possible to control the position of the kink by replacing the plate 5 with a rigid guide means which in its simplest embodiment has an edge contacting the tube in two diametrically opposed regions, the separation of said regions being not greater than the original diameter of the tube. Thus two edges which are parallel to each other and also parallel to the transverse seam 4 to be formed can be employed, the separation between the edges being substantially equal to the original diameter of the tube. The aperture 6 may also be made rectangular.

It has been found in practice, that the simple apparatus shown in FIG. 1 only provides the desired control of the position of the kink when certain web materials are used. In order that the apparatus may be used satisfactorily with other cheaper web materials, it must be modified by an additional integer as may be seen from the embodiment of FIG. 2.

FIG. 2 shows a tube 7 which is to be formed into a tetrahedral package. The tube has just passed through means (not shown) which has formed the longitudinal seam and already contains the filling material for the package. Below the forming means there is provided in the direction of advance of the tube a guide means, shown in FIG. 2 as a support plate 9 having a square aperture 8 formed therein. The upper edge of a tubular sleeve 10 of inelastic material is secured in the aperture 8 so that the sleeve hangs down below the plate 9 and extends into the vicinity of sealing jaws 11 serving to form a transverse seam. The internal circumference of the sleeve 10 is adapted to the circumference of the filled tube so that it closely embraces the same.

In its advance the tube 7 therefore enters the sleeve 10 in the region of the aperture 8 and is guided thereby almost until it reaches the plane of the sealing jaws 11. Since the sleeve, on the one hand, closely embraces the outer surface of the tube 7, and on the other hand, is made from a rigid inelastic material, a lateral sharp bending out of the tube wall arises and possible crack formation is avoided. In practice, the deformation of the wall of the tube 7 caused by the formation of the transverse seam, i.e., when the sealing jaws 11 come together, is limited to the region beyond the sleeve 10. By the coaction of the guide means 9 with the sleeve 10, the deformation of the tube 7 can be controlled at will and the formation of undesirable kinks and cracks during transverse sealing is avoided.

FIG. 3 shows a third embodiment of apparatus, similar parts having the same but primed reference numerals as in FIG. 2. In FIG. 3, the guide means 9' has a circular aperture 8' and the sleeve 10' is of flexible inelastic material.

Polytetrafluoroethylene is a suitable material for the construction of the sleeve 10.

I claim:

1. Apparatus for producing improved transversely seamed tetrahedral hollow packages adapted to envelop a fluent product material prior to finish seaming, which packages are fabricated from a preformed flexible wall, generally cylindrical tubular stock material normally susceptible to undesirable kinks and weakening cracks during the transverse sealing, said apparatus comprising:
   (a) a plate (9) having a rectangular shaped aperture (8), therethrough for generally receiving passage of the tubular stock material in a direction generally normal to the major dimensional plane of the plate;
   (b) an open ended semi-rigid sleeve (10) having a rectangular cross-section which at least at one end has an outer periphery which corresponds to that of and connects engagingly within the rectangular shaped aperture (8) in said plate (9) and through which sleeve said stock material is embraceably guided and passed so as to contact the sleeve at two diametrically opposite regions, and is controllably shaped so as to avoid weakening cracks by causing any potential stock material kinks to be eliminated and displaced to coincide with the portion of the stock material subsequently seamed;
   (c) means beyond said plate to form a pair of seams at spaced intervals across the stock material after passing through said plate (9) and sleeve (10), with means for forming one of one of the seams in a direction transversely to that of the other seam;
   (d) said sleeve (10) having the length of the internal periphery of its rectangular cross-sectional shape corresponding substantially equal to the circumference of the cylindrical stock material which passes therethrough; and
   (e) said sleeve (10) extending a substantial distance beyond said plate (9) in the tube-advancing direction toward the seam-forming means.

2. Apparatus as defined in claim 1 wherein the rectangular aperture and sleeve are substantially of square cross-section.

3. Apparatus as defined in claim 1 wherein said sleeve 10 terminates at its end remote from the plate (9) near the seam-forming means.

4. Apparatus for producing improved transversely seamed tetrahedral hollow packages adapted to envelop a fluent product material prior to finish seaming, which packages are fabricated from a preformed flexible wall, generally cylindrical tubular stock material normally susceptible to undesirable kinks and weakening cracks during the transverse sealing, said apparatus comprising:
   (a) a plate (9') having a generally cylindrical shaped aperture (8') therethrough for generally receiving passage of the tubular stock material in a direction generally normal to the major dimensional plane of the plate;
   (b) an open-ended semi-rigid sleeve (10') having at one end a cross-sectional shape corresponding to and engagingly connected within the plate aperture (8'), and through which sleeve said stock material is embraceably guided and passed so as to contact the sleeve at two diametrically opposite regions, and is controllably shaped to avoid weakening cracks by causing any potential stock material kinks to be eliminated and displaced to coincide with the portion of the stock material subsequently seamed;
   (c) means beyond said plate to form a pair of seams at spaced intervals across the stock material after passing through said plate (9') and sleeve (10'), with means for forming one of one of the seams in a direction transversely to that of the other seam;
   (d) said sleeve 10' having the length of its internal cross-sectional periphery corresponding substantially to that of the outer circumference of the stock material which passes therethrough; and
   (e) said sleeve (10') extending a substantial distance beyond said plate (9') in the tube-advancing direction toward the seam-forming means, said sleeve (10') progressively changing in cross-sectional shape from a generally circular form at the plate-connected end to a generally eliptical form at its other end.

5. Apparatus as defined in claim 4 wherein said sleeve (10') terminates at its end remote from the plate (9') near the seam-forming means.

References Cited

UNITED STATES PATENTS

| | | | |
|---|---|---|---|
| 2,140,213 | 12/1938 | Tegarty | 156—203 |
| 2,570,921 | 10/1951 | Collins | 156—203 |
| 2,962,843 | 12/1960 | Hoelzer et al. | 156—201X |
| 3,056,339 | 10/1962 | Sommerfeld et al. | 156—203 |
| 3,234,309 | 2/1966 | Graff | 156—202 |
| 3,296,661 | 1/1967 | De Moustier | 264—95 |
| 3,372,077 | 3/1968 | Torudd | 156—198 |

SAMUEL W. ENGLE, Primary Examiner

U.S. Cl. X.R.

156—145, 203, 466